United States Patent Office 2,947,663
Patented Aug. 2, 1960

2,947,663

PHOSPHORIC AND THIOPHOSPHORIC PHENOL ESTERS CONTAINING AN AZO GROUP AND METHODS OF PREPARING SAME

Giuseppe Losco and Cesare Augusto Peri, Milan, Italy, assignors to Montecatini-Societa Generale per l'Industria Mineraria e Chimica, a corporation of Italy No Drawing. Filed Oct. 30, 1957, Ser. No. 693,241

Claims priority, application Italy Nov. 7, 1956

10 Claims. (Cl. 167—30)

The present invention relates to a new class of compounds of the general formulas:

$$\begin{array}{c}RO\\ \phantom{RO}\diagdown\\ \phantom{RO}\phantom{O}P-O-\phenyl-N=N-\phenyl-R'\\ RO\diagup\overset{\|}{X}\end{array} \quad (I)$$

$$\begin{array}{c}RO\\ \phantom{RO}\diagdown\\ \phantom{RO}\phantom{O}P-O-\phenyl-N=N-\phenyl-R'\\ RO\diagup\overset{\|}{X}\phantom{-O-\phenyl-N}\overset{\|}{O}\end{array} \quad (II)$$

wherein R represents a low molecular weight alkyl, e.g. methyl or ethyl, X is oxygen or sulfur, R' is a hydrogen atom or a halogen or a monovalent radical, e.g. $NO_2$, $OCH_3$, $OC_2H_5$, $CH_3$, and to a process for obtaining them.

The radical R' can be in the ortho-, meta- or para-position with respect to the nitrogen atom. In the group of azoxy derivatives (Formula II) the oxygen atom can be isomerically bound to either nitrogen atom.

We have found that compounds, defined by the aforementioned formulas, have antiparasitic properties and are very effective in control of the domestic fly, including strains resistant to the usual chlorinated insecticides.

These compounds show, generally, a very low toxicity towards warm blooded animals as indicated by experiments with rats, including oral and intravenous administration of definite amounts of these compounds.

Another outstanding characteristic is the remarkable stability of these materials and their persistence on the walls, which assures a long duration of the anti-parasitic action.

It is, therefore, one of the objects of the present invention to furnish new phosphoric and thiophosphoric esters containing an azo group.

It is a further object of the invention to furnish in these new compounds antiparasitic materials, particularly for controlling the house fly.

It is a still further object of the invention to provide methods of preparing these compounds.

These and other objects and advantages of the present invention will appear more clearly from the hereinfollowing detailed description and the examples.

The compounds of the present invention are obtained by reacting an halide of an O,O-dialkylphosphoric or thiophosphoric acid having a general formula $$\begin{array}{c}RO\\ \phantom{RO}\diagdown\\ \phantom{RO}\phantom{O}P-Y\\ RO\diagup\overset{\|}{X}\end{array}$$

wherein Y represents a halogen atom, with phenolic compounds of the following types:

$$MO-\phenyl-N=N-\phenyl-R' \quad (III)$$

$$MO-\phenyl-N=N-\phenyl-R' \quad (IV)$$
$$\phantom{MO-\phenyl-N}\overset{\|}{O}$$

wherein M represents an alkali metal.

The reaction is carried out in a solvent for one or both reactants, at temperatures between 0° and 150° C.

In the alternative, instead of using an alkaline salt of the phenolic compound, the free phenolic compounds and a basic metal compound of sufficient alkalinity to bind the hydrohalogenic acid set free during the reaction may be used (for example: sodium or potassium hydroxide, sodium or potassium carbonate, sodium methylate or ethylate).

The desired materials, obtained after removal of the reaction by-products, can be purified by crystallization from suitable organic solvents or by means of a high vacuum distillation. In some cases, chromatographic purification on alumina may be used.

We also found that thiophosphoric esters (X being sulfur) of this invention can be transformed into the corresponding phosphoric esters (X being oxygen) by means of suitable oxidants, such as hydrogen peroxide in an acetic medium.

The conversion of the azo group into an azoxy group can also be carried out by reacting hydrogen peroxide with the phosphoric esters.

The compounds of the present invention can be used in many formulations. In general it is convenient to dilute them with solid, liquid or semisolid vehicles (in the form of a paste); wetting agents, adhesives, dispersing agents, emulsifiers, etc. can be added thereto. Other substances having an insecticidal or, generally, antiparasitic action can also be added thereto.

The following examples are submitted to illustrate, but in no way to limit, the present invention.

EXAMPLE 1

18.2 g. of the O,O-diethylthiophosphoric acid chloride are added to a suspension of 25 g. of p-nitro-benzene-azophenol sodium salt in 150 cc. of acetone. The mixture is refluxed for 2 hours while vigorously stirring. Sodium chloride is removed by filtration and the acetone solution is concentrated. The residue, crystallized from methyl alcohol, yields 19 g. of a brick red material (M.P. 71–72° C.) consisting of p-nitrobenzene azophenol O,O-diethylthiophosphoric ester.

Using the sodium salt of benzene azophenol and proceeding in the same manner, benzene azophenol O,O-diethylthiophosphate is obtained, consisting of red crystals having a melting point of 53° C.

EXAMPLE 2

19.8 g. of benzene azophenol and 10 g. of finely pulverized potassium carbonate are added to 150 cc. of acetone. The mixture is vigorously stirred and 17.5 g. of O,O-diethylphosphoric acid chloride are introduced. After refluxing for 4 hours while stirring is continued, and cooling, the mixture is poured into water. The oil which separates thereupon is extracted with carbon tetrachloride and washed, first with an aqueous solution of 5% $K_2CO_3$ and then with water. After evaporation of the solvent, 27 g. of an orange colored oil, which can be purified by vacuum distillation (residual pressure 0.2–0.3 mm. Hg; oven temperature 200–230° C.) are obtained. The compound obtained is benzene-azophenol-O,O-diethylphosphoric ester.

Proceeding in the same manner, the following products have been prepared:

4(4'-chloro-benzene-azo)phenol O,O-diethylphosphoric ester; crystals (from petroleum ether), M.P. 48–49° C.,
4(4'-ethoxy-benzene-azo)phenol O,O-diethylphosphoric ester; crystals (from ligroine), M.P. 42.5–43° C.,
4(4'-nitrobenzene-azo)phenol O,O-diethylphosphoric ester; crystals (from ligroine), M.P. 92–93° C., 4(3'-nitrobenzene-azo)phenol O,O-diethylphosphoric ester; crystals (from ligroine), M.P. 40–41° C., 4(2'-nitrobenzene-azo)phenol O,O-diethylphosphoric ester; an oil which can be purified by high vacuum distillation, 4(2'-chlorobenzene-azo)phenol-diethylphosphoric ester; an oil which can be purified by high vacuum distillation, 4(4'-tolyl-azo)phenol O,O-diethylphosphoric ester; crystals (from ligroine), M.P. 34–35° C., 4(2'-methoxy-benzene-azo)phenol O,O-diethylphosphoric ester; an oil which can be purified by high vacuum distillation, 4(α-naphthyl-azo)phenol O,O-diethylphosphoric ester; an oil which can be purified by chromatography on alumina, 4(4'-methoxy-benzene-azo)phenol O,O-diethylphosphoric ester, crystals, M.P. 20–22° C.

EXAMPLE 3

22.8 g. of 4(4'-methoxy-benzene-azo)phenol and 10 g. of finely pulverized $K_2CO_3$ are added to 150 cc. of acetone. The mixture is vigorously stirred and 18.8 g. of the O,O-diethylthiophosphoric acid chloride are introduced.

The mixture is refluxed for 4 hours while stirring and, after cooling, poured into ground ice. The solid material which separates is washed with a 5% $K_2CO_3$ solution and then with water. 17 g. of 4(4'-methoxy-benzene-azo)-phenol O,O-diethylthiophosphoric ester are obtained; crystals (from methanol), M.P. 41–42° C.

Proceeding in a similar manner, the following products have been prepared:

4(4'-chloro-benzene-azo)phenol O,O-diethylthiophosphoric ester; crystals, M.P. 48° C., 4(4' - ethoxy - benzene - azo)phenol O,O-diethylthiophosphoric ester; crystals (from methanol), M.P. 56–57° C., 4(4'-nitro-benzene-azo)phenol O,O-diethylthiophosphoric ester; (see Example 1), 4(3'-nitro-benzene-azo)phenol O,O-diethylthiophosphoric ester; crystals (from methanol), M.P. 50–51° C., 4(2'-nitro-benzene-azo)phenol O,O-diethylthiophosphoric ester; an oil which can be purified by chromatography on $Al_2O_3$, 4(2' - chloro - benzene - azo)phenol O,O - diethylthiophosphoric ester; an oil which can be purified by chromatography on $Al_2O_3$, 4(4'-tolyl-azo)phenol O,O-diethylthiophosphoric ester; an oil which can be purified by chromatography on $Al_2O_3$, 4(2'-methoxy-benzene-azo)phenol O,O-diethylthiophosphoric ester; an oil which can be purified by chromatography on $Al_2O_3$, 4(α-napthyl-azo)phenol O,O-diethylphosphoric ester; an oil which can be purified by chromatography on $Al_2O_3$.

EXAMPLE 4

19.8 g. of benzene-azo-phenol, 10 g. of finely pulverized $K_2CO_3$ and 16 g. of O,O-dimethylthiophosphoric acid chloride are added to 150 cc. of acetone. The mixture is refluxed for 4 hours, while stirring continuously and, after cooling, is treated with ground ice. The solid material (30.3 g.), washed with a 5% $K_2CO_3$ solution and then with water, consists of benzene-azo-phenol O,O-dimethylthiophosphoric ester; crystals (from methanol), M.P. 44–46° C.

Proceeding in a similar manner, the following products have been prepared:

4(4'-chloro-benzene-azo)phenol O,O-dimethylthiophosphoric ester; crystals (from methanol), M.P. 77–78° C., 4(4'-methoxy-benzene-azo)phenol O,O-dimethylthiophosphoric ester; crystals (from methanol), M.P. 63–64° C.

EXAMPLE 5

38 g. of a high melting benzene-azoxy-phenol isomer (Angeli, Gazz. Ch. It. 46, II, 106), 18.5 g. of potassium carbonate and 31.5 g. of O,O-diethylthiophosphoric acid chloride are added to 200 cc. of acetone. The mixture is refluxed for 4 hours while vigorously stirring, and is then cooled to room temperature, by pouring the mixture into ground ice. The solid product obtained in this manner is crystallized from methanol. The high melting isomer of benzene-azoxy-phenol O,O-diethylthiophosphoric ester is obtained, M.P. 35.5–37° C.

Using the low melting isomer of benzene-azoxy-phenol (loc. cit.) and operating in a similar manner, the corresponding O,O-diethylthiophosphoric ester is obtained consisting of a light-yellow oil which, when purified by chromatography on $Al_2O_3$, produces a crystalline material melting at 27–28° C.

EXAMPLE 6

12.4 g. of 4(4'-chloro-benzene-azoxy)phenol, 5 g. of $K_2CO_3$ and 8 g. of O,O-dimethylthiophosphoric acid chloride are added to 80 cc. of acetone. The mixture is refluxed for 4 hours while vigorously stirring, and is then cooled and poured into water. The separated solid is filtered off, washed with a 5% $K_2CO_3$ solution and then with water.

17.3 g. of a solid material which, when crystallized from methanol, melts at 72° C., are obtained. It consists of 4(4'-chloro-benzene-azoxy)phenol O,O-dimethylthiophosphoric ester.

Proceeding in a similar manner, the following products have been prepared:

Benzene-azoxy-phenol O,O-dimethylthiophosphoric ester; crystals (from methanol, M.P. 44–45° C., 4(4'-chloro-benzene-azoxy)phenol O,O-dimethylthiophosphoric ester; crystals (from methanol), M.P. 49–50° C., 4(4'-nitro-benzene-azoxy)phenol O,O-dimethylthiophosphoric ester; crystals (from methanol), M.P. 73–74° C.

EXAMPLE 7

12.4 g. of 4(4'-chloro-benzene-azoxy)phenol, 5 g. of $K_2CO_3$ and 8.7 g. of O,O-diethylphosphoric acid chloride are added to 80 cc. of acetone. The mixture is refluxed for 4 hours while vigorously stirring, cooled and poured into water. The separated solids are filtered off, washed with a 5% $K_2CO_3$ solution and then with water. 15 g. of a product which, after crystallization from petroleum ether, melts at 43–45° C., are obtained. It consists of the 4(4'-chloro-benzene-azoxy) phenol O,O-diethylphosphoric ester.

Proceeding in a similar manner, the following products have been prepared:

Benzene-azoxy-phenol O,O-diethylphosphoric ester; an oil which can be purified by high vacuum distillation.

4(4'-nitro-benzene-azoxy)phenol O,O - diethylphosphoric ester; crystals (from ligroine), M.P. 90–91° C.

EXAMPLE 8

11.3 g. of 4(4'-nitro-benzene-azo)phenol O,O-diethylphosphoric ester (prepared according to Example 2), are dissolved in 60 cc. of glacial acetic acid and treated at 95–100° C. with 10 cc. of 30% hydrogen peroxide. The mixture is heated on a boiling water bath for 10 hours and, after cooling, treated with water and the separated solids filtered off. 11 g. 4(4'-nitro-benzene-azoxy)phenol O,O-diethylphosphoric ester, identical with the material mentioned in Example 7, are obtained.

EXAMPLE 9

39.5 g. of 4(4'-nitro-benzene-azo)phenol O,O-diethylthiophosphoric ester (Examples 1 and 3) are dissolved in 200 cc. of glacial acetic acid and carefully treated at 95–100° C. with 75 cc. of 30% hydrogen peroxide. The mixture is heated for 10 hours on a boiling water bath and treated as shown in Example 8. 27 g. of a crude product, substantially consisting of 4(4'-nitro-benzene-azoxy)phenol O,O-diethylphosphoric ester, are obtained.

*Evaluation of the biological activity tests of products named in the preceding examples*

Generally, the herein claimed products are highly efficient insecticidal compounds and are useful in the control of parasites, particularly the fly.

The following examples illustrate these characteristics.

EXAMPLE 10

Upon topic application, with a microsyringe, of an acetone solution of the test products on 5-day old domestic flies, the following percent average mortalities have been obtained after 20 hours:

| γ/fly | 10 | 2 | 0.4 |
|---|---|---|---|
| A. benzene-azo-phenol O,O-diethylthiophosphoric ester | 100 | 100 | 18 |
| B. benzene-azoxy-phenol-O,O-diethylthiophosphoric ester (low melting isomer) | 100 | 100 | 48 |
| C. benzene-azoxy-phenol-O,O-diethylthiophosphoric ester (high melting isomer) | 100 | 100 | 79 |
| D. 4(4'-chloro-benzene-azo)phenol O,O-diethylthiophosphoric ester | 100 | 100 | 75 |
| E. 4(4'-nitro-benzene-azo)phenol O-O-diethylthiophosphoric ester | 100 | 100 | 98 |
| F. 4(3'-nitro-benzene-azo)phenol O,O-diethylthiophosphoric ester | 100 | 100 | 100 |
| G. 4(2'-nitro-benzene-azo)phenol O-O,diethylthiophosphoric ester | 100 | 100 | 2 |
| H. benzene-azoxy-phenol O,O-diethylphosphoric ester | 100 | 100 | 65 |
| I. 4(4'-chloro-benzene-azo)phenol O,O-diethylphosphoric ester | 100 | 100 | 100 |
| L. 4(4'-ethoxy-benzene-azo)phenol O,O-diethylphosphoric ester | 100 | 100 | 35 |
| M. 4(4'-nitro-benzene-azo)phenol O-O-diethylphosphoric ester | 100 | 100 | 100 |
| N. 4(4'-nitro-benzene-azoxy)phenol O-O-diethylphosphoric ester | 100 | 100 | 100 |
| O. 4(3'-nitro-benzene-azo)phenol O-O-diethylphosphoric ester | 100 | 100 | 100 |
| P. 4(2'-nitro-benzene-azo)phenol O-O-diethylphosphoric ester | 100 | 63 | 0 |

EXAMPLE 11

Upon tarsal absorption, by introducing female flies, 5-days old, into beakers previously treated with controlled amounts of benzene solutions of the test products of the preceding example and keeping the flies in contact for 20 hours, the following mortalities have been obtained:

| Substance | 0.125 g./m.$^2$ of active substance | 0.025 g./m.$^2$ of active substance | 0.005 g./m.$^2$ of active substance |
|---|---|---|---|
| A | 100 | 94 | 27 |
| B | 100 | 100 | 60 |
| C | 100 | 100 | 81 |
| D | 100 | 88 | 5 |
| E | 100 | 100 | 83 |
| F | 100 | 100 | 95 |
| G | 100 | 90 | 5 |
| H | 100 | 70 | 12 |
| I | 100 | 100 | 70 |
| L | 100 | 90 | 2 |
| M | 100 | 100 | 100 |
| N | 100 | 100 | 95 |
| O | 100 | 100 | 86 |
| P | 98 | 18 | 0 |

EXAMPLE 12

Determination of the acute toxicity of the test products after oral or intravenous application:

The acute toxicity upon oral application has been determined by gastric probing and administration of the test products, dissolved in dimethylacetamide, to rats weighing 18 to 20 g. The solvent interferes only very slightly with the toxic manifestations:

For the determination of intravenous toxicity the dimethylacetamide solution has been also employed.

The results obtained with some of the products claimed in the present patent application are reported in the following table:

| Substance | application | |
|---|---|---|
| | oral LD/50 | intravenous LD/50 |
| A | 1.5 g./kg. do not cause any mortality. | |
| B | 1.5 g./kg. | 400 mg./kg. cause a mortality of 20–30%. |
| E | 1 g./kg. causes a mortality of 10%. | |
| F | 800 mg./kg. do not cause any mortality. | 200 mg./kg. do not cause any mortality. |
| I | 800 mg./kg. cause a mortality of 40–50%. | Do. |
| M | 800 mg./kg. do not cause any mortality. | 150 mg./kg. cause a mortality of 10–20%. |
| N | 800 mg./kg. cause a mortality of 10%. | 200 mg./kg. cause a mortality of 30%. |
| O | 112 mg./kg. | 69 mg./kg. |

The above fly-killing compounds can be employed in admixture with each other, and with other fly-killing substances, such as the known chlorinated organic compounds, other phosphoric and thiophosphoric esters, thiocyanates, pyrethrum esters, and synthetic pyrethrins, as well as with fungicides and fertilizers.

We claim:

1. The process of preparing phosphoric and thiophosphoric esters of the general formula

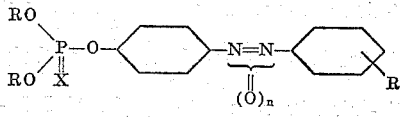

wherein R represents a lower alkyl, X represents a member of the group consisting of oxygen and sulfur, R' represents a member of the group consisting of hydrogen, methoxy, para-ethoxy, para-chloro, ortho-chloro, ortho-nitro, meta-nitro, and para-nitro, and $n$ represents the factors 0 and 1, said process comprising reacting, at a temperature ranging from 0 to 150° C., a chloride of the group consisting of O,O-dialkyl phosphoric and thiophosphoric acids of the general formula

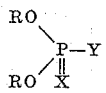

wherein Y represents chlorine, with a phenolic compound of the general formula

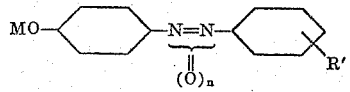

wherein M represents an alkali metal, in a solvent for at least one of the two reactants and separating the reaction product.

2. The process of preparing phosphoric and thiophosphoric esters of the general formula

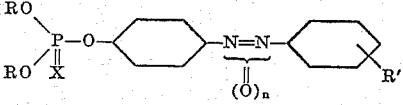

wherein R represents a lower alkyl, X represents a member of the group consisting of oxygen and sulfur, R' represents a member of the group consisting of hydrogen, methoxy, para-ethoxy, para-chloro, ortho-chloro, ortho-nitro, meta-nitro, and para-nitro, and $n$ represents the factors 0 and 1, said process comprising reacting, at a temperature ranging from 0 to 150° C., a chloride of the group consisting of O,O-dialkyl phosphoric and thiophosphoric acids of the general formula

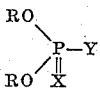

wherein Y represents chlorine, with a phenolic compound of the general formula

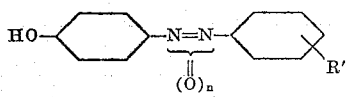

and a basic alkali metal compound to bind the hydrogen chloride which forms during the reaction, the reaction being carried out in a solvent for at least one of the two reactants, and separating the reaction product.

3. As parasiticidal, particularly fly-killing compounds, phosphoric and thiophosphoric esters of the general formula

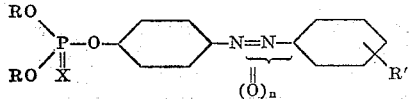

wherein R represents a lower alkyl, X represents a member of the group consisting of oxygen and sulfur, R' represents a member of the group consisting of hydrogen, methoxy, para-ethoxy, para-chloro, ortho-chloro, ortho-nitro, meta-nitro, and para-nitro, and n represents the factors 0 and 1.

4. 4(3'-nitro-benzene-azo)phenol O,O-diethylthiophosphoric ester.

5. 4(4'-chloro-benzene-azo)phenol O,O-diethylphosphoric ester.

6. 4(4'-nitro-benzene-azo)phenol O,O-diethylphosphoric ester.

7. 4(3'-nitro-benzene-azo)phenol O,O-diethylphosphoric ester.

8. 4(4'-nitro-benzene-azoxy)phenol O,O-diethylphosphoric ester.

9. In the art of control of flies at a locality, the improvement comprising applying to the locality a compound taken from the group consisting of benzene-azo-phenol O,O-diethylthiophosphoric ester, 4(4'-chloro-benzene-azo) phenol O,O-diethylthiophosphoric ester, 4(4'-nitro-benzene-azo)phenol O,O-diethylthiophosphoric ester, 4(3'-nitro-benzene-azo)phenol O,O-diethylthiophosphoric ester, 4(2'-nitro-benzene-azo)phenol O,O-diethylthiophosphoric ester, benzene-azoxy-phenol O,O-diethylphosphoric ester, 4(4'-chloro-benzene-azo)phenol O,O-diethylphosphoric ester, 4(4'-ethoxy-benzene-azo)phenol O,O-diethylphosphoric ester, 4(4'-nitro-benzene-azo)phenol O,O-diethylphosphoric ester, 4(4'-nitro-benzene-azoxy)phenol O,O-diethylphosphoric ester, 4(3'-nitro-benzene-azo)phenol O,O-diethylphosphoric ester, 4(2'-nitro-benzene-azo)phenol O,O-diethylphosphoric ester.

10. In the art of control of flies at a locality, the improvement comprising applying to the locality a compound of the formula

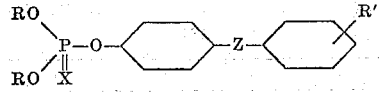

in which R is a lower alkyl, X is a member of the group consisting of oxygen and sulphur, the R' radical is taken from the group consisting of hydrogen, methoxy, para-ethoxy, para-chloro, ortho-chloro, ortho-nitro, meta-nitro, and para-nitro, and Z is a radical taken from the group consisting of the linkage —N=N— and azoxy.

References Cited in the file of this patent

UNITED STATES PATENTS

| | | |
|---|---|---|
| 2,741,656 | Schmid et al. | Apr. 10, 1956 |
| 2,803,580 | Metivier | Aug. 20, 1957 |
| 2,807,637 | Slagh et al. | Sept. 24, 1957 |

OTHER REFERENCES

Kosolapoff: "Organophosphorous Compounds," 1950, p. 266.